United States Patent [19]

Harada et al.

[11] Patent Number: 4,551,439

[45] Date of Patent: Nov. 5, 1985

[54] SOLID CATALYST COMPONENT FOR OLEFIN POLYMERIZATION AND PROCESS FOR PRODUCING SAME

[75] Inventors: Masato Harada, Kisarazushi; Shinya Miya; Sadahiko Yamada, both of Ichiharashi; Makoto Iijima, Ichiharashi, all of Japan

[73] Assignee: Chisso Corporation, Japan

[21] Appl. No.: 700,592

[22] Filed: Feb. 11, 1985

[30] Foreign Application Priority Data

Oct. 4, 1984 [JP] Japan ................................ 59-208775

[51] Int. Cl.[4] .............................................. C08F 4/64
[52] U.S. Cl. ..................................... 502/107; 502/111; 502/113; 502/119; 502/125; 502/127; 526/125
[58] Field of Search ............... 502/107, 111, 113, 125, 502/127, 119

[56] References Cited

U.S. PATENT DOCUMENTS

| | | | |
|---|---|---|---|
| 4,006,101 | 2/1977 | Matsuura et al. | 502/111 |
| 4,208,304 | 6/1980 | Fahey | 502/111 |
| 4,330,649 | 5/1982 | Kioka et al. | 502/125 X |
| 4,399,054 | 8/1983 | Ferraris et al. | 502/127 X |
| 4,399,055 | 8/1983 | Matsuura et al. | 502/119 X |
| 4,456,695 | 6/1984 | Nimura et al. | 502/127 X |
| 4,477,588 | 10/1984 | Hawley | 502/119 |

FOREIGN PATENT DOCUMENTS 2111066  6/1983  United Kingdom ................ 502/127

Primary Examiner—Patrick P. Garvin
Attorney, Agent, or Firm—Fred Philpitt

[57] ABSTRACT

A solid catalyst component for olefin polymerization having a high polymerization activity and affording a highly stereoregular polymer having a good particulate form, and a process for producing the same are provided, which component indispensably contains Mg, Ti, Al, halogen and alkoxy group; has two absorption peaks (absorbances $A_1$ and $A_2$) at specified wavenumbers within a specified region of spectra according to infrared spectrophotometry, $A_1/A_2$ and $A_1/A_3$ ($A_3$: an absorbance at a specified wavenumber) being each in a specified range; and has X-ray diffraction spectra distinctive from those of Mg halide or its complex with electron donor, and which process consists of step I of dissolving (a) anhydrous Mg dihalide, (b) a specified orthotitanic or polytitanic acid ester and (c) a specified alcohol in an inert hydrocarbon solvent to prepare component A; step II of mixing and reacting component A with component B consisting of (d) a specified organic acid ester, (e) a specified Al halide and (f) a specified Si halide to prepare solid product (I); and step III of reacting solid product (I) with component C consisting of (g) a specified Ti halide and/or (h) a specified vanadyl or vanadium halide to obtain solid product (II) as the objective catalyst component.

5 Claims, 8 Drawing Figures

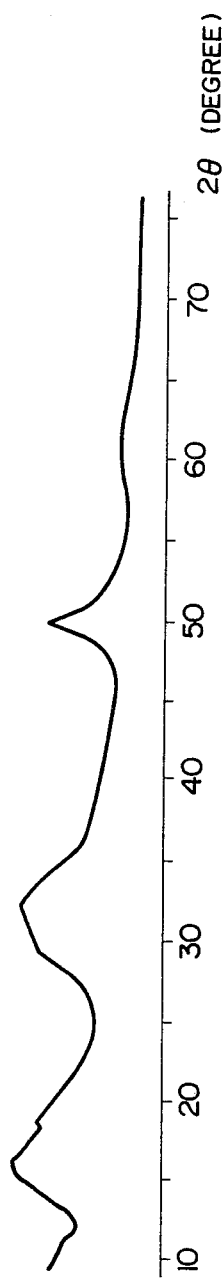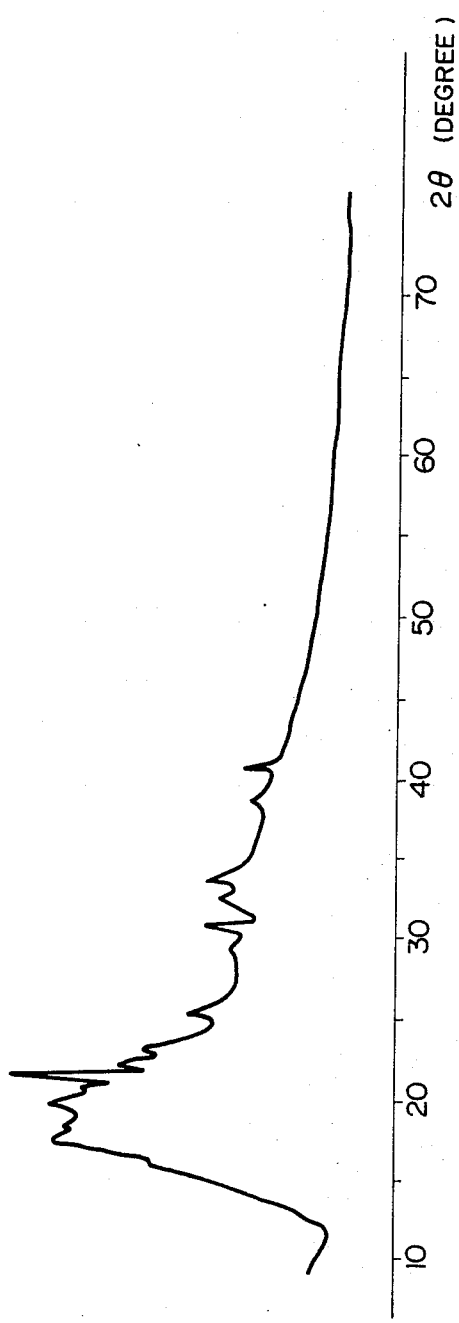

SOLID CATALYST COMPONENT FOR OLEFIN POLYMERIZATION AND PROCESS FOR PRODUCING SAME

BACKGROUND OF THE INVENTION

1. Field of the Invention

This invention relates to a solid catalyst component for α-olefin polymerization and a process for producing the same.

More particularly the present invention relates to a novel supported type solid catalyst component for supported type Ziegler-Natta catalysts, obtained by dissolving an anhydrous magnesium dihalide, a titanic acid ester and an alcohol in an inert hydrocarbon solvent, mixing and reacting the resulting solution with a silicon halide, an organic acid ester and an aluminum halide and further reacting the resulting solid product (I) with a titanium halide and/or a vanadium halide, and a process for producing the same.

α-Olefin polymers referred to in the present invention mean homopolymers of α-olefins having 3 or more carbon atoms and copolymers of α-olefins having 3 or more carbon atoms with α-olefins different from the above and having 2 or more carbon atoms, the proportion of the former α-olefins in the copolymers being 50% by weight or more.

2. Description of the Prior Art

Heretofore, in order to improve Ziegler-Natta catalysts, those which have a high polymerization activity and also can afford a highly stereospecific polymer have been energetically pursued. In recent years, however, it has come to be required for the catalysts that in addition to the above propoerties, the catalysts are to be further provided with a property due to which the polymer can also have a good particulate form. In the present invention, such a good particulate form of polymer particles refers to (1) a fact that the form of polymer particles is spherical or nearly spherical, (2) a fact that the particle diameters of polymer particles are within a definite range and the particle diameter distribution of polymer particles is extremely narrow and (3) a fact that the proportion of polymer particles having an extremely small particle diameter i.e. the so-called finely divided powder present in the polymer particles is extremely small.

Such a good particulate form of polymer particles brings about a great effectiveness. For example, particularly in the gas phase polymerization process which is carried out without any solvent in principle and hence commercially very economical, the resulting polymer has a good fluidity to make possible a long term stabilized operation of polymerization apparatus. Further, in the α-olefin polymerization, practically no adhesion of polymer to the inner wall of polymerization vessel or stirrer occurs, to ease polymer withdrawal from the polymerization vessel and make it possible to carry out polymer production in the same apparatus, for a long time, continuously and in stabilized manner.

Further, such a good particulate form of polymer particles brings about the following advantages a~g with respect of production in the steps subsequent to the polymerization step:

a. It is easy to separate polymer from solvent in the slurry polymerization process.

b. It is easy to transport or recover polymer.

c. Feed of polymer to granulator and operations at the time of processing and molding are easy.

d. It is possible to inhibit dust explosion due to the presence of finely divided powder, and since the amount of finely divided powder is small and handling of polymer particles is simplified, productivity is improved.

e. In the case of copolymerization process, it is possible to inhibit inferiority in the form of polymer particles and reduction in the bulk density due to copolymerization. Namely, copolymer production becomes easy.

f. It is possible to omit the expensive polymer granulation step in the case of certain use applications or transportation manners of polymer.

g. All the above advantages a~f contribute directly or indirectly to energy saving or resources saving and further make it possible to improve the quality of polymer in respect of product homogenity; as a result, it is possible to correspond to new market needs concerning the quality.

Now, in the olefin polymerization by means of Ziegler-Natta catalysts, it has been known that there is a close relationship between the particulate form of the resulting polymer and the particulate form of the solid catalyst used. Namely, it has been observed that the particulate form of the solid catalyst is reflected on that of the polymer. Thus, for improving the particulate form of the polymer, it is necessary to improve the particulate form of the solid catalyst to be used, and also it is necessary that the catalyst retain a strength to such an extent that it is not ground when used, i.e. during the polymer production process.

As for supported type catalysts for α-olefin polymerization, it has so far been known that an anhydrous magnesium halide, an organic acid ester and a titanium halide are reacted by co-milling to give a solid catalyst affording a high polymerization activity and a highly stereoregular polymer (Japanese patent application laid-open No. Sho 50-1269590/1975). However, even if α-olefins are polymerized using such a solid catalyst, it is impossible to obtain α-olefin polymers having a good particulate form, since the particulate form of the solid catalyst used is irregular and the particle size was not specified.

Now, anhydrous magnesium halides are per se insoluble in inert hydrocarbon solvents. However, it has been known that if anhydrous magnesium halides are reacted with orthotitanic acid esters and/or alcohols, anhydrous magnesium halides are soluble in inert hydrocarbon solvents. Utilizing such a solubilizing reaction, for example Japanese patent application laid-open No. Sho 54-40293/ 1979 proposes a process wherein anhydrous magnesium chloride, butyl orthotitanate and n-butanol are heated together with heptane and uniformly dissolved and $SiCl_4$ is added to the resulting solution to deposit solids, followed by reacting the solids with a complex of $TiCl_4$ and ethyl benzoate obtained by dissolving these in n-butyl chloride to obtain a solid catalyst component. The above laid-open application also proposes as an alternative process, a process wherein anhydrous magnesium chloride, butyl orthotitanate and ethyl benzoate are heated in n-butyl chloride, followed by first reacting $SiCl_4$ to deposit solids and then reacting $TiCl_4$ with the solids to obtain a solid catalyst component. However, judging from this alternative process, alcohols are not indispensable compounds for dissolving anhydrous magnesium chloride in an inert hydrocarbon and affording sufficient catalyst performances. Thus, even if propylene is polymerized using he catalysts obtained by these processes, the polymerization activity of the catalysts is not high enough to make it possible to omit removal of catalyst residue contained in the resulting polypropylene. Further, the stereoregularity of the polymer obtained by polymerizing α-olefins by the use of this catalyst is insufficient, and moreover the above laid-open patent application has no description as to the particulate form of the polypropylene obtained according to the process of the application.

Next, Japanese patent application laid-open No. Sho 58-32604/1983 proposes a process wherein anhydrous magnesium chloride, butyl orthotitanate and ethyl toluylate are heated in heptane to prepare a uniform solution, which is then reacted with $SiCl_4$ to deposit solids, which are then washed with an inert solvent and thereafter reacted with $TiCl_4$ to obtain a solid catalyst. However, the performance of the catalyst obtained according to this process is still insufficient in the yield or stereoregularity of the resulting polymer. Further the above application has no description as to the particulate form of the polymer except for a description that the particle diameter distribution of the resulting polymer is narrow.

According to Japanese patent application laid-open Nos. Sho 56-811/1981 and Sho 56-11908/1981, anhydrous magnesium chloride is reacted with an alcohol and the resulting material is dissolved in a hydrocarbon solvent, followed by adding to the solution a titanium halide or a silicon halide for re-solidification to obtain a solid catalyst. However, Examples of the above applications have no concrete description as to the particulate form of polymer.

According to Japanese patent application laid-open No. Sho 56-136805/1981, anhydrous magnesium chloride is reacted with an alcohol and the resulting material is dissolved in a hydrocarbon solvent, followed by reacting a titanium halide therewith for solidification to obtain a solid catalyst. However, it is an indispensable requirement for the process to have a liquid hydrocarbon contained in the solid catalyst in an amount of 10 to 25% by weight to thereby control the particulate form of the polymer.

According to Japanese patent application laid-open No. Sho 57-74307/1982, it has been attempted to improve the particulate form of polymer by pretreating the solid product with an organoaluminum compound, in addition to the process of the above application No. Sho 56-1136805. However, in any of the processes disclosed in Japanese patent application laid-open Nos. Sho 56-811 to Sho 57-74307, orthotitanic acid esters and/or polytitanic acid esters are not indispensable compounds for dissolving anhydrous magnesium chloride in an inert hydrocarbon and affording sufficient catalyst performances.

Thus, any of the solid catalysts obtained according to the foregoing processes do not fully satisfy all of the polymerization activity, the stereoregularity and the particulate form of polymer.

As described above, according to the prior art, it has been possible to solubilize anhydrous magnesium dihalides in inert hydrocarbon solvents by using the dihalides together with titanic acid esters or alcohols. However, their re-solidification has been difficult. As a result, it has also been difficult to control the particulate form of the solid catalysts, and ultimately no polymer having a good particulate form has been obtained.

In order to solve the above problems of the prior art, the present inventors have made extensive research, noting the process of solubilizing anhydrous magnesium dihalides in an inert hydrocarbon solvent, followed by re-solidification. As a result, by using a solid product obtained by reacting anhydrous magnesium dihalides with a titanic acid ester and an alcohol at the same time to thereby easily solubilize the dihalides in an inert hydrocarbon solvent, and also reacting the resulting solution with an organic acid ester, an aluminum halide and a silicon halide, it has become possible to enhance the stereoregularity of olefin polymers obtained by using a finally obtained catalyst; to control the particulate form of the carrier for solid catalyst obtained by using a relatively small amount of the silicon halide; and to ultimately obtain a solid catalyst having a good particulate form and being resistant to grinding.

As apparent from the foregoing, the object of the present invention is to provide a solid catalyst component which has a high polymerization activity to such an extent that it is unnecessary to remove the catalyst remaining in polymer, and also which can afford a highly stereoregular polymer having a good particulate form, and a process for producing the same as well as a process for utilizing the same.

SUMMARY OF THE INVENTION

The present invention has the following two main constitutions (aspects) (1) and (2): (1) A solid catalyst component for olefin polymerization, consisting of a solid composition containing as indispensable components, magnesium, titanium, aluminum, halogen and alkoxy group, characterized in that (1) when said catalyst component is subjected to infrared spectrophotometry, it has two absorption peaks in the vicinity of 1,067 cm$^{-1}$ and in the vicinity of 1,038 cm$^{-1}$ within the region of 1,070~1,030 cm$^{-1}$, and when the absorbance at the former peak is referred to as $A_1$ and that at the latter peak, as $A_2$, the ratio of $A_1$ to $A_2$ is in the range of 1.1 to 1.8, and also when the absorbance in the vicinity of 1,670 cm$^{-1}$ is referred to As $A_3$, the ratio of $A_1$ to $A_3$ is in the range of 0.30 to 0.80; (2) in a state where no liquid inert hydrocarbon is contained, said solid catalyst component contains two kinds of alkoxy groups based on a combination of titanic acid ester(s) and an alcohol, both as starting raw materials for said catalyst component, the respective amounts of the alkoxy groups being each in the range of 0.05 to 5.0% by weight, and the sum of the amounts thereof being in the range of 0.1 to 7.0% by weight; and (3) said solid catalyst component has X-ray diffraction spectra which are clearly distinctive from those of magnesium halide or a complex of magnesium halide with an electron donor.

(2) A process for producing a solid catalyst component for olefin polymerization, characterized by producing it via the reactions of the following steps I to III:

I. a step of mixing (a) an anhydrous magnesium dihalide, (b) an orthotitanic acid ester expressed by the general formula $Ti(OR^1)_4$ and/or a polytitanic acid ester expressed by the general formula $R^2\text{---}O\text{---}Ti(OR^3)(OR^4)_{\overline{m}}O\text{---}R^5$ wherein $R^1$, $R^2$, $R^3$, $R^4$ and $R^5$ each represent an alkyl group having 1 to 20 carbon atoms or an aryl group having 6 to 20 carbon atoms or a cycloalkyl group having 3 to 20 carbon atoms and m represents a number of 2 to 20, and (c) a saturated or unsaturated, monohydric or polyhydric alcohol, in an inert hydrocarbon solvent and dissolving these materials therein, to obtain a component A;

II. a step of mixing and reacting said component A with a component B consisting of (d) an aliphatic or aromatic, mono- or polycarboxylic acid ester having 2 to 24 carbon atoms (hereinafter referred to as organic acid ester), (e) an aluminum halide expressed by the general formula $AlX_nR^8_{3-n}$ wherein X is Cl or Br, $R^8$ represents an alkyl group having 1 to 20 carbon atoms an aryl group having 1 to 20 carbon atoms or a cycloalkyl group having 3 to 20 carbon atoms and n represents a number of 0 to 3, and (f) a silicon halide expressed by the general formula $SiX_lR^6_{4-l}$ or $SiX_p(OR^7)_{4-p}$ wherein X represents Cl or Br, R and $R^7$ each represent an alkyl group having 1 to 20 carbon atoms, an aryl group having 1 to 20 carbon atoms or a cycloalkyl group having 3 to 20 carbon atoms and l and p each represent a number of 1 to 4, to deposit solids (hereinafter referred to as "solid product (I)"); and III. reacting this solid product (I) with a component C consisting of (g) a titanium halide expressed by the general formula $TiX_q(OR^9)_{4-q}$ wherein X represents Cl or Br, $R^9$ represents an alkyl group having 1 to 20 carbon atoms, an aryl group having 1 to 20 carbon atoms or a cycloalkyl group having 3 to 20 carbon atoms and q represents a number of 1 to 4, and/or (h) a vanadyl halide or a vanadium halide expressed by the general formulas $VOX_s(OR^{10})_{3-s}$ or $VX_t(OR^{11})_{4-t}$ wherein X represents Cl or Br, $R^{10}$ and $R^{11}$ each represent an alkyl group having 1 to 20 carbon atoms, an aryl group having 1 to 20 carbon atoms or a cycloalkyl group having 3 to 20 carbon atoms, s represents a number of 1 to 3, and t represents a number of 1 to 4, to obtain solids (hereinafter referred to as "solid product (II)").

BRIEF DESCRIPTION OF THE DRAWINGS

FIGS. 4~8 show the X-ray diffraction charts of the solid product of the present invention (Example 1) and Comparative samples A~D.

DETAILED DESCRIPTION OF THE PREFERRED EMBODIMENTS

Figure 1:
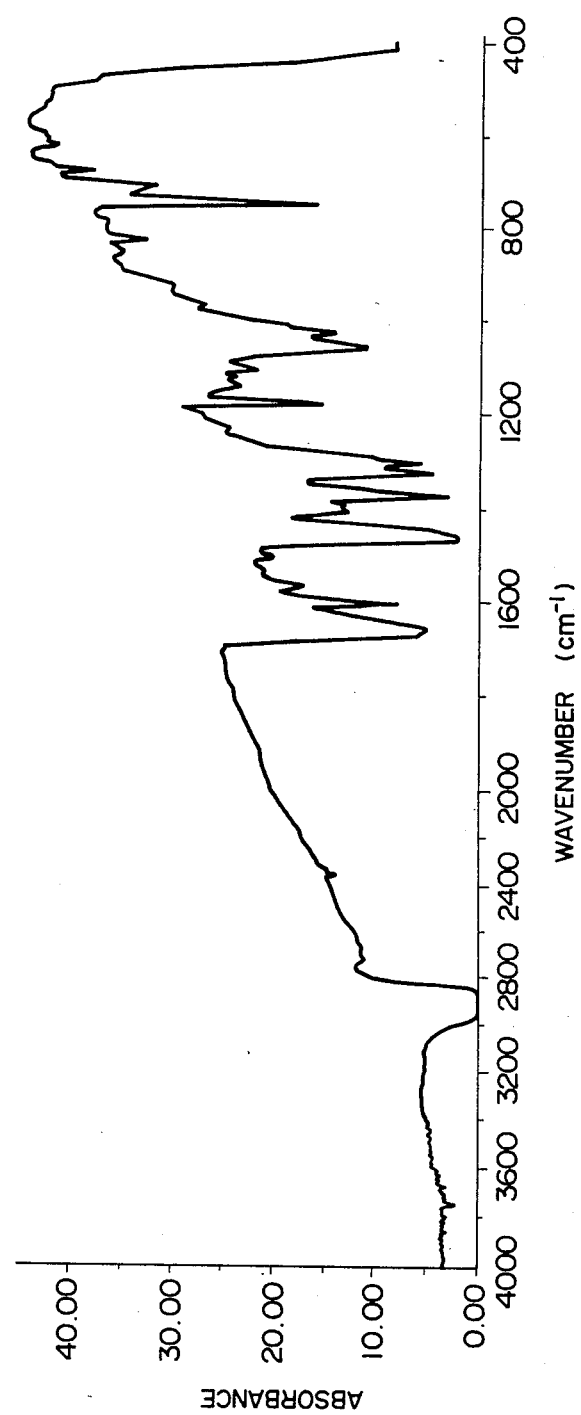
FIG. 1 shows the infrared absorption chart of the solid product (II) as the catalyst component of the present invention.
Figure 2:
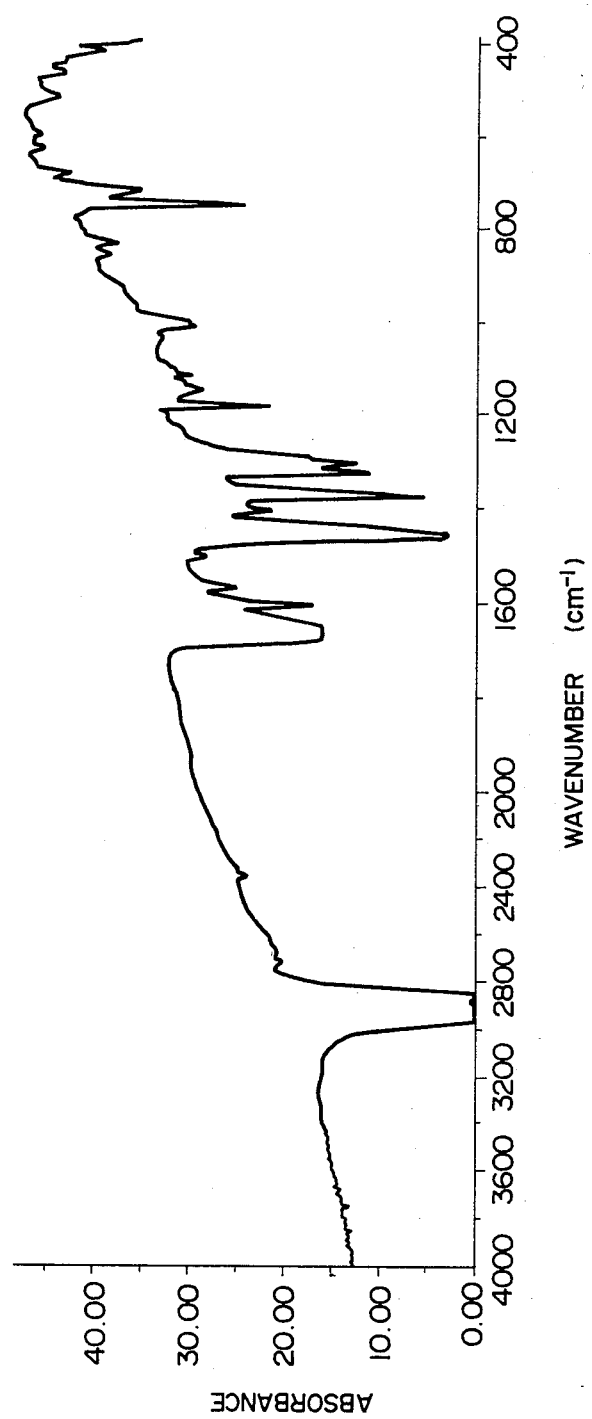
FIGS. 2 and 3 show the infrared absorption spectra charts of the solid products of Comparative examples 1 and 2.
Figure 3:
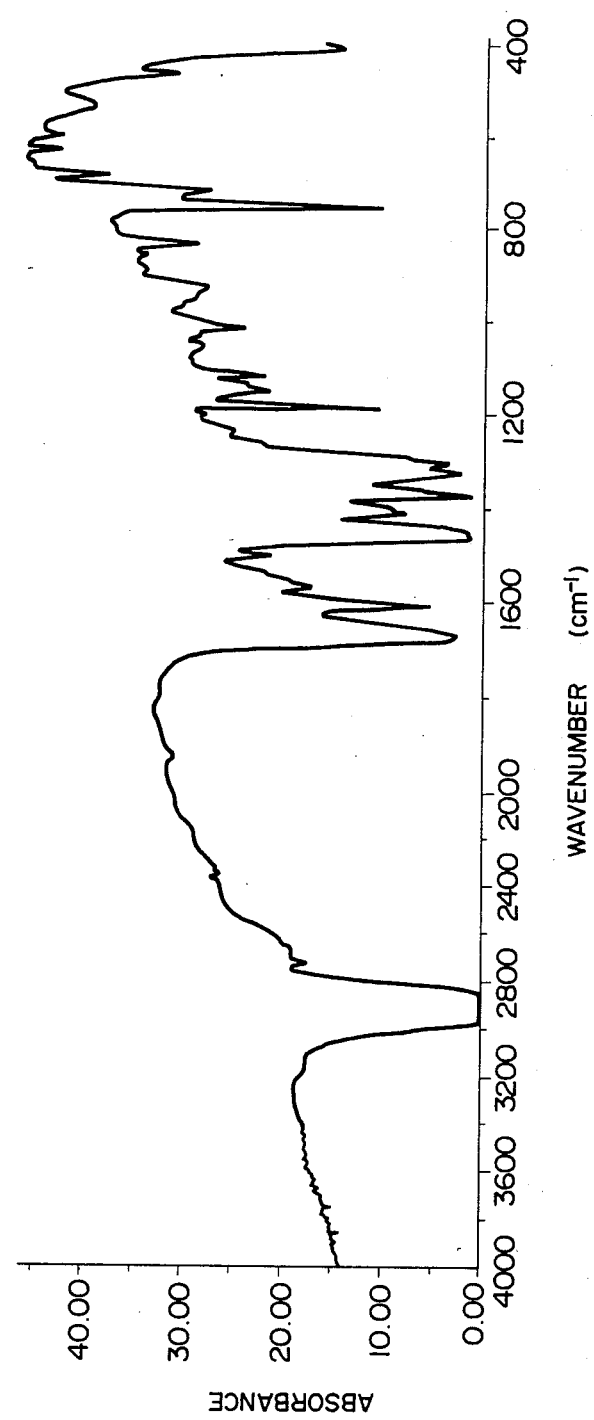
Figure 5:
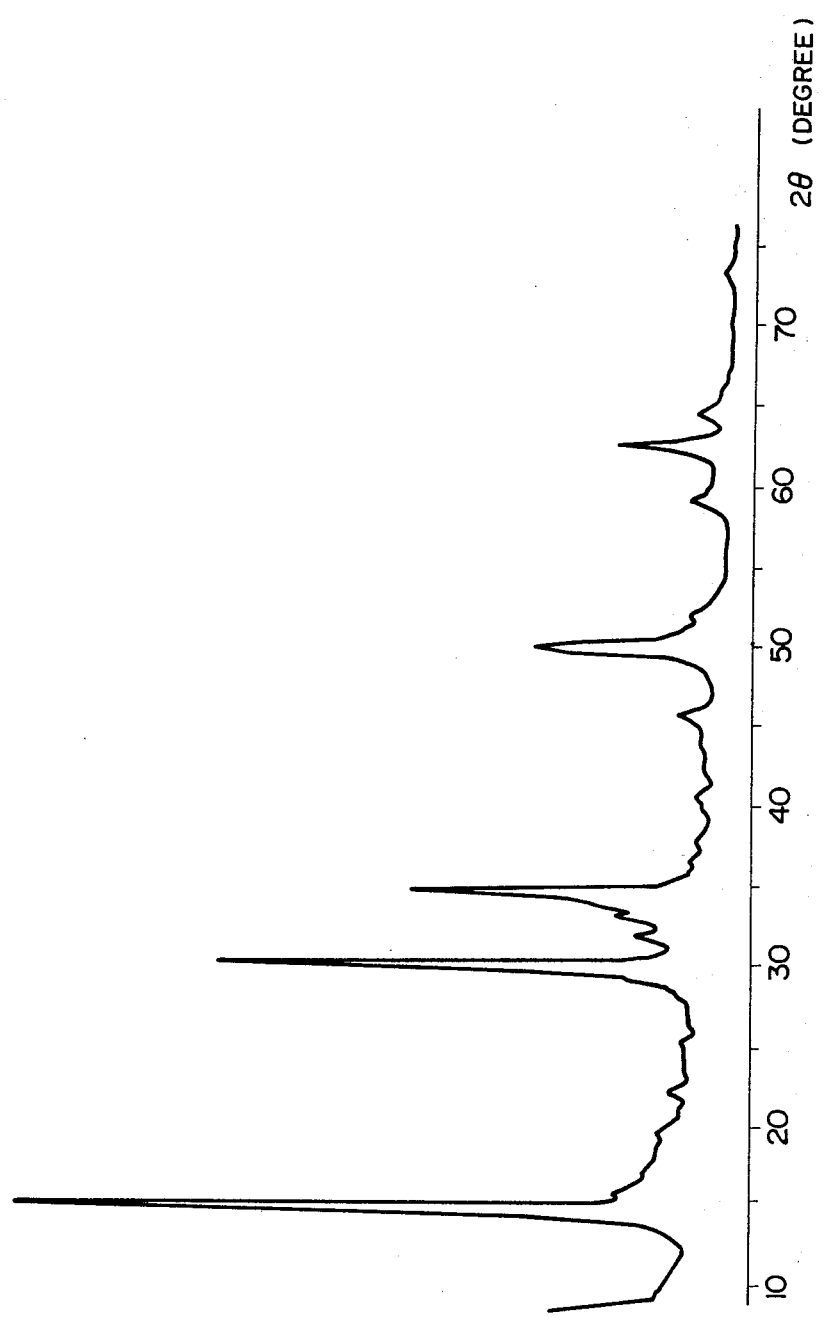
Figure 7:
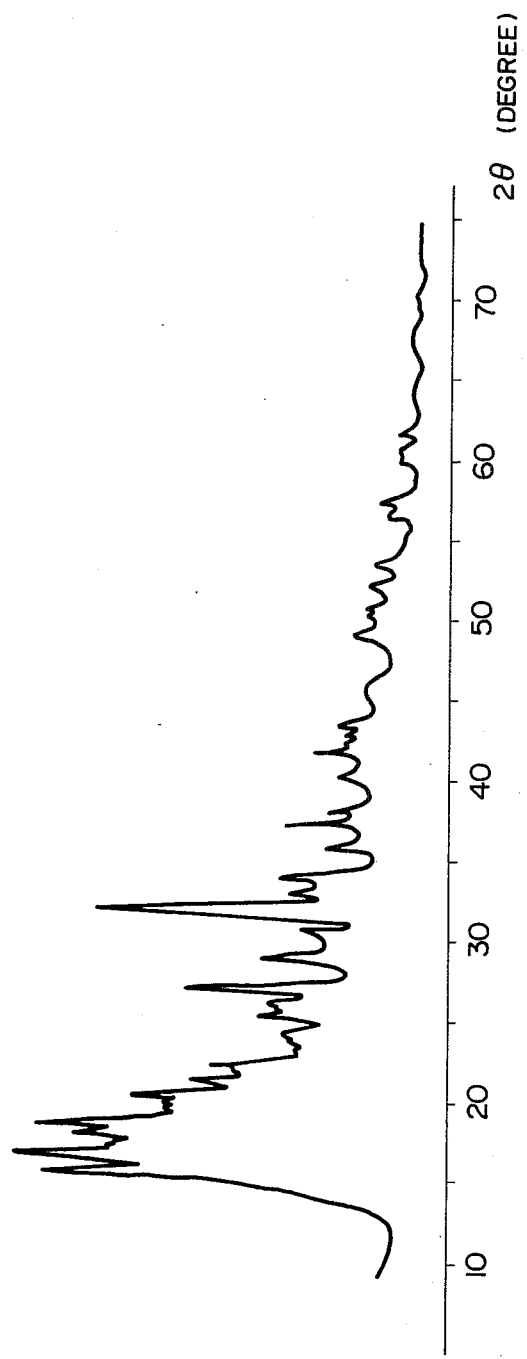
Figure 8:
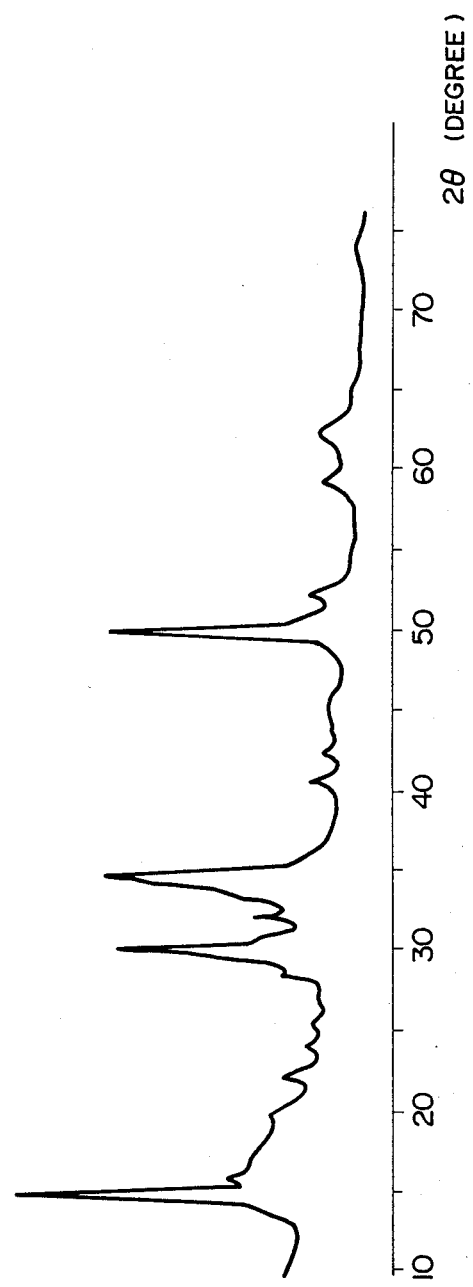

The constitution and effectiveness of the present invention will be further described in more detail.

First, the above component A will be described.

Component A is obtained by reacting and dissolving components (a), (b) and (c) in an inert hydrocarbon solvent, as described above. Component (a) is an anhydrous magnesium dihalide. As the anhydrous magnesium dihalide, anhydrous magnesium chloride and anhydrous magnesium bromide may be used. The "anhydrous" compounds referred to herein may be those containing a trace of moisture to the same extent as that in commercially available products sold as "anhydrous" compounds. Component (b) is a titanic acid ester. This titanic acid ester is an orthotitanic acid ester expressed by the formulas $Ti(OR^1)_4$ or a polytitanic acid ester expressed by the formula $R^2\hspace{-2pt}+\hspace{-2pt}O-Ti(OR^3)(OR^4)\hspace{-2pt}+\hspace{-2pt}_{m}OR^5$ wherein $R^1$, $R^2$, $R^3$, $R^4$ and $R^5$ each represent an alkyl group having 1 to 20 carbon atoms, an aryl group having 1 to 20 carbon atoms or a cycloalkyl group having 3 to 20 carbon atoms and m represents a number of 2 to 20. Concrete examples of the titanic acid esters usable are orthotitanic acid esters such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate, cyclohexyl orthotitanate, etc. and polytitanic acid esters such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate, cyclohexyl polytitanate, etc. Component (c) is an alcohol. As the alcohol, aliphatic, saturated or unsaturated alcohols are usable. Concrete examples of the alcohols usable are monohydric alcohols such as methyl alcohol, ethyl alcohol, n-propyl alcohol, i-propyl alcohol, n-butyl alcohol, n-amyl alcohol, i-amyl alcohol, n-hexyl alcohol, n-octyl alcohol, 2-ethylhexyl alcohol, allyl alcohol, etc. and further, polyhydric alcohols such as ethylene glycol, trimethylene glycol, glycerol, etc. Among these, aliphatic saturated alcohols having 4 to 10 carbon atoms are preferable.

Examples of the inert hydrocarbon solvent used for dissolving components (a), (b) and (c) are aliphatic hydrocarbons such as pentane, hexane, heptane, nonane, decane, kerosene, etc., aromatic hydrocarbons such as benzene, toluene, xylene, etc. and halogenated hydrocarbons such as carbon tetrachloride, 1,2-dichloroethane, 1,1,2-trichloroethane, chlorobenzene, o-dichlorobenzene, etc. Among these, aliphatic hydrocarbons are preferable.

As concrete methods for reacting and dissolving components (a), (b) and (c) in an inert hydrocarbon solvent, the following may be enumerated: (b) a method wherein components (a), (b) and (c) are mixed in an inert hydrocarbon solvent in any addition order and the resulting suspension is heated with stirring; (2) components (b) and (c) are heated in an inert hydrocarbon solvent with stirring and component (a) is added to the resulting solution; a method wherein components (a) and (b) are heated in an inert hydrocarbon solvent with stirring and component (c) is then added; (4) a method wherein components (a) and (c) are heated in an inert hydrocarbon solvent with stirring and component (b) is then added; and the like methods.

Any of the above methods may be employed, but the method (b 1) is preferable in that the operation is very easy. In order to dissolve components (a), (b) and (c) in an inert hydrocarbon solvent, heating is necessary. The heating temperature is in the range of 40° to 200° C., preferably 50° to 150° C. The time required for the reaction and dissolution is in the range of 5 minutes to 7 hours, preferably 10 minutes to 5 hours. The amount of component (b) used is in the range of 0.1 to 2 mols, preferably 0.5 to 1.5 mol, based on one mol of component (a) in the case where component (b) is an orthotitanic acid ester, and if component (b) is a polytitanic acid ester, an amount corresponding to that of orthotitanic acid ester as calculated into orthotitanic acid ester units may be used. The amount of component (c) used is in the range of 0.1 to 5 mols, preferably 0.5 to 4 mols based on one mol of component (a).

The more the amounts of components (b) and (b) used for component (a), the easier the dissolution of component (a), but when (a) is dissolved in such a manner, it is necessary for solidifying component A to use a very large amount of a silicon halide, and moreover, the solidification itself becomes difficult, and even if the component A is solidified, it is difficult to adjust the particulate form. Further if the amounts of components (b) and (b) used are too small, component (a) is insoluble in an inert hydrocarbon solvent and the resulting supported type catalyst component has irregular form; hence it is impossible to prepare the supported type solid catalyst component having the properties aimed in the present invention. The amount of the inert hydrocarbon solvent used is in the range of 0.1 to 5 l, preferably 0.3 to 3 l based on one mol of component (a).

Next, component B will be described. Component B consists of components (d), (e) and (f). Component (d) is an organic acid ester. Its examples are aliphatic carboxylic acid esters such as methyl acetate, ethyl acetate, n-propyl acetate, i-propyl acetate, n-butyl acetate, ethyl propionate, n-propyl propionate, i-butyl propionate, ethyl butyrate, phenyl acetate, etc. and aromatic carboxylic acids such as methyl benzoate, ethyl benzoate, methyl toluylate, ethyl toluylate, methyl anisate, ethyl anisate, phenyl anisate, diethyl phthalate, di-n-butyl phthalate, di-i-butyl phthalate, etc. Component (e) is an aluminum halide expressed by the general formula $AlX_nR^8{}_{3-n}$ wherein X is Cl or Br, $R^8$ represents an alkyl group having 1 to 20 carbon atoms, an aryl group having 1 to 20 carbon atoms or a cycloalkyl group having 3 to 20 carbon atoms, and n represents a number of 0 to 3. Concrete examples are aluminum trichloride, ethylaluminum dichloride, butylaluminum dichloride, ethylaluminum sesquichloride, diethylaluminum chloride, dipropylaluminum chloride, triethylaluminum, tributylaluminum, triphenylaluminum, diphenylaluminum chloride, tricyclohexylaluminum, dicyclohexylaluminum chloride, aluminum tribromide, ethylaluminum dibromide, etc. Component (f) is a silicon halide expressed by the general formulas $SiX_lR^6{}_{4-l}$ or $SiX_p(OR^7)_{4-p}$ wherein X is Cl or Br, $R^6$ and $R^7$ each represents an alkyl group having 1 to 20 carbon atoms, an aryl group having 1 to 20 carbon atoms or a cycloalkyl group having 3 to 20 carbon atoms, and l and p each are a number of 1 to 4. Concrete examples of the halide of $SiX_lR^6{}_{4-l}$ are silicon tetrachloride, silicon tetrabromide, ethylsilicon trichloride, propylsilicon trichloride, butylsilicon trichloride, phenylsilicon trichloride, cyclohexyl trichloride, ethylsilicon tribromide, diethylsilicon dichloride, dibutylsilicon dichloride, triethylsilicon chloride, etc. and concrete examples of the halide of $SiX_p(OR^7)_{4-p}$ are silicon tetrachloride, silicon tetrabromide, methoxysilicon trichloride, ethoxysilicon trichloride, propoxysilicon trichloride, butoxysilicon trichloride, phenoxysilicon trichloride, ethoxysilicon tribromide, dimethoxysilicon dichloride, diethoxysilicon dichloride, dibutoxysilicon dichloride, diphenoxysilicon dichloride, dimethoxysilicon dibromide, trimethoxysilicon chloride, triethoxysilicon chloride, etc. Further, these compounds are usable in admixture. Among these, silicon tetrachloride is preferable. These components may be diluted with an inert hydrocarbon solvent as described above, and used.

Next, reaction of component A with component B will be described. A solid product (I) is obtained by the reaction of component A with component B. This reaction may be carried out in various addition manners such as (i) a manner wherein component B is added to component A; (ii) a manner wherein component A is added to component B; or (iii) a portion of component B is added to component A and a remaining portion of component B is added to the mixture or the mixture is added to a remaining portion of component B. Concretely the following addition manners (1)~(6) are illustrated:

(1) Component A is reacted with component (d) and successively or simultaneously reacted with component (e) and thereafter reacted with component (f) to deposit a solid product (I).

(2) Component A is reacted with components (d), (e) and (f) at the same time to deposit a solid product (I).

(3) Component A is reacted with component (f) to deposit a solid material which is then reacted with component (d) and successively or simultaneously reacted with component (e) to obtain a solid product (I).

(4) Component A is reacted with a mixture and/or a reaction product of component (d) with component (e) and thereafter reacted with component (f) to deposit a solid product (I).

(5) Component A is reacted with component (f) to deposit a solid material which is then reacted with a mixture and/or a reaction product of component (d) with component (e) to obtain a solid product (I).

(6) Any two or more of the above manners (1)~(5) are combined. Any of the above manners may be employed. Even if component (d) and/or component (e) are mixed or reacted with component A, no solids precipitate. Component A or a mixture or reaction product of component A with component (d) and/or component (e) is a uniform solution. For depositing solids from these uniform solutions, component (f) is necessary. As for the addition manners (1)–(6) it is usually preferred for component (d) and component (e) to add these to component A, but component (f) may be added to component A or contrarily, component A may be added to component (f). Since the particulate form of the solid product (II) is ruled by that of the solid product (I), the reaction of component (f) with component A or with a mixture or reaction product of component A with component (d) and/or component (e) is very important for controlling the particulate form.

The proportions of component A and components (d), (e) and (f) used are as follows: Based on one mol of component (a) constituting component A as one of its raw materials, the amount of component (d) used is in the range of 0.05 to 0.7 mol, preferably 0.1 to 0.6 mol, the amount of component (e) used is in the range of 0.005 to 0.5 mol, preferably 0.01 to 0.4 mol and the amount of component (f) used is in the range of 0.1 to 50 mols, preferably 1 to 20 mols. These components may be used all at once or at several divided stages. The reaction temperature of component A with component B is in the range of −40° to +180° C., preferably −20° to +150° C. and the reaction time is in the range of 5 minutes to 5 hours, preferably 10 minutes to 3 hours at each one stage. The solid product (I) deposited by the reaction of component A with component B may be successively reacted with component C at the next stage, but it is preferred to once wash the product (I) with an inert hydrocarbon solvent as described above, since unreacted substances or byproducts present in the solution may obstruct the subsequent reaction. Thus the solid product (I) obtained has a spherical form or a nearly spherical form.

Next, component C will be described. Component C consists of component (g) and/or component (h). Component (g) is a titanium halide expressed by the general formula $TiX_q(OR^9)_{4-q}$ wherein, X is Cl or Br, $R^9$ represents an alkyl group having 1 to 20 carbon atoms, an aryl group having 1 to 20 carbon atoms or a cycloalkyl group having 3 to 20 carbon atoms and q represents a number of 1 to 4. Concrete examples are titanium tetrachloride, titanium tetrabromide, methoxytitanium trichloride, ethoxytitanium trichloride, propoxytitanium trichloride, butoxytitanium trichloride, hexoxytitanium trichloride, octoxytitanium trichloride, phenoxytitanium trichloride, cyclohexoxytitanium trichloride, ethoxytitanium tribromide, butoxytitanium tribromide, dimethoxytitanium dichloride, diethoxytitanium dichloride, dipropoxytitanium dichloride, dibutoxytitanium dichloride, dioctoxytitanium dichloride, diphenoxytitanium dichloride, dicyclohexoxytitanium dichloride, diethoxytitanium dibromide, dibutoxytitanium dibromide, trimethoxytitanium chloride, triethoxytitanium chloride, tributoxytitanium chloride, triphenoxytitanium chloride, triethoxytitanium bromide, triphenoxytitanium bromide, etc. Titanium halides other than titanium tetrachloride and titanium bromide can be prepared by reacting a titanium tetrahalide with an orthotitanic acid ester, and in the reaction of the step III, it is also possible to use a mixture of a titanium tetrahalide with an orthotitanic acid ester in place of the above reaction product. As the orthotitanic acid ester, the same ones as already mentioned may be used. Among these titanium halides, titanium tetrachloride is most preferable.

The component (h) is a vanadyl halide or a vanadium halide expressed by the general formula $VOX_s(OR^{10})_{3-s}$ or $VX_t(OR^{11})_{4-t}$ wherein X is Cl or Br, $R^{10}$ and $R^{11}$ each represent an alkyl group having 1 to 20 carbon atoms, an aryl group having 1 to 20 carbon atoms or a cycloalkyl group having 3 to 20 carbon atoms, s represents a number of 1 to 3 and t represents a number of 1 to 4. Concrete examples are vanadyl trichloride, vanadyl tribromide, methoxyvanadyl dichloride, ethoxyvanadyl dichloride, butoxyvanadyl dichloride, phenoxyvanadyl dichloride, cyclohexoxyvanadyl dichloride, ethoxyvanadyl dibromide, dimethoxyvanadyl chloride, diethoxyvanadyl chloride, diphenoxyvanadyl chloride, diethoxyvanadyl bromide, vanadium tetrachloride, vanadium tetrabromide, methoxyvanadium trichloride, ethoxyvanadium trichloride, butoxyvanadium trichloride, phenoxyvanadium trichloride, cyclohexoxyvanadium trichloride, ethoxyvanadium tribromide, dimethoxyvanadium dichloride, diethoxyvanadium dichloride, dibutoxyvanadium dichloride, diphenoxyvanadium dichloride, diethoxyvanadium dibromide, triethoxyvanadium chloride, triphenoxyvanadium chloride, triethoxyvanadium bromide, etc. Among these vanadyl halides and vanadium halides, vanadyl trichloride and vanadium tetrachloride are preferable.

Component (g) and component (h) may be used in the form of a mixture and/or a reaction product thereof in the reaction thereof with the solid product (I). Further they may be diluted with an inert hydrocarbon solvent as described above, and used.

Next, the reaction of the solid product (I) with component C will be described. It is possible to carry out this third step reaction by adding component C to the solid product (I) suspended in an inert hydrocarbon solvent as described above, or by adding the solid product (I) or its suspension to component C. The amount of component (g) or component (h) used is in the range of 1 to 100 mols, preferably 3 to 50 mols based on one mol of the anhydrous magnesium dihalide as one of the raw materials constituting the solid product (I). The reaction temperature of the solid product (I) with component C is in the range of 40° to 200° C., preferably 50° to 150° C. and the reaction time is in the range of 5 minutes to 5 hours, preferably 10 minutes to 3 hours. After the reaction, the resulting solids are separated by filtering off or decantation, followed by washing with an inert hydrocarbon solvent to remove unreacted materials or byproducts, whereby the solid product (II) is obtained. The solvent used for the washing is a liquid inert hydrocarbon. Concrete examples are aliphatic, saturated hydrocarbons such as hexane, heptane, octane, nonane, decane, kerosene, etc. During or after the washing, it is necessary to make the solid product (II) coexistent with a liquid aliphatic saturated hydrocarbon as described above, in an amount of at least 50% by weight of the product (II). As the washing manner, decantation manner is particularly preferable, and after the washing it is preferred that the liquid aliphatic hydrocarbon be coexistent with the product (II) in at least an amount to such an extent that the product (II) is immersed in the hydrocarbon. In the case where the hydrocarbon is coexistent with the solid product (II) in only less than 50% by weight based on the product (II), even if such a solid product (II) is combined with an organoaluminum compound and the resulting combination is used for polymerization, sufficient catalyst performances are not exhibited. Namely, according to the polymerization results, the polymer yield and bulk density are both low, the particulate form of polymer is inferior and the stereoregularity is also low. While the reason has not yet been clarified, it is important that during or after the washing, the solid product (II) be preserved in the coexistence thereof with a liquid aliphatic saturated hydrocarbon in at least 50% by weight based on the product (II).

According to the X-ray diffraction method, the solid product (II) has no spectra based on not only anhydrous magnesium dihalides but also complexes of anhydrous magnesium dihalides with electron donative compounds (alcohols, organic acid esters or titanic acid esters). According to the infrared spectrophotometry, the solid product (II) has specific features that its spectra have two absorption peaks in the vicinity of 1,067 $cm^{-1}$ and in the vicinity of 1,038 $cm^{-1}$ within the region of 1,070~1,030 $cm^{-1}$, and when the absorbance at the former peak is referred to as $A_l$ and that at the latter peak, as $A_2$, the ratio of $A_l$ to $A_2$ is in the range of 1.1 to 1.8, preferably 1.2 to 1.7, and also when the absorbance at a peak in the vicinity of 1,670 $cm^{-1}$ is referred to as $A_3$, the ratio of $A_1$ to $A_3$ is in the range of 0.30 to 0.80, preferably 0.40 to 0.70. In order that the solid product (II) exhibits its intrinsic performances, it is necessary that it has the above two absorptions within the infrared region of 1,070~1,030 $cm^{-1}$ and the two kinds of absorbance ratios of $A_1/A_2$ and $A_1/A_3$ are in the above ranges, respectively. For example, even when the above two absorptions are present, if either one or both of the above two kinds of absorbance ratios exceed the upper limit value or do not reach the lower limit value, no sufficient polymerization activity is exhibited, and/or the stereoregularity of the resulting polymer is insufficient, and/or the particulate form of the polymer is inferior; hence it is impossible to achieve the object of the present invention.

Further, according to the composition analysis method, the solid product (II) has a specific feature that it has two kinds of alkoxy groups, one being based on component (b) and another being based on component (c), and contains the alkoxy groups based on components (b) and (c), each in an amount in the range of 0.05 to 5.0% by weight, preferably 0.1 to 4.0% by weight, the sum of these two kinds of the alkoxy groups being in the range of 0.1 to 7.0% by weight, preferably 0.5 to 6.0% by weight. Thus, in order that the solid product (II) exhibits its intrinsic performances, it is necessary that it contains the above two kinds of alkoxy groups and the contents thereof are in the above ranges, respectively. For example, if the solid product (II) contains only either one of the alkoxy groups, no sufficient polymerization activity is exhibited and the stereoregularity of the resulting polymer is insufficient. Above all, if the solid product (II) contains alkoxy group(s) based on component (b) and no alkoxy group based on component (c), the particulate form of the resulting polymer is inferior. Further, even in the case where the above two kinds of alkoxy groups are present in the product (II), if either one or both thereof exceed the upper limit value or do not reach the lower limit value, no sufficient polymerization activity is exhibited and/or the stereoregularity of the resulting polymer is insufficient and/or the particulate form is inferior; hence it is impossible to achieve the object of the present invention.

Next, the process for producing α-olefin polymers will be described. When the solid product (II) is combined as a catalyst component with an organoaluminum compound and preferably an organic acid ester, it is possible to make the combination a catalyst for producing α-olefin polymers. As for the organoaluminum compound to be combined, it is possible to use compounds expressed by the formula $AlX_rR^{12}_{3-r}$ wherein X is Cl; $R^{12}$ represents an alkyl group having 1 to 20 carbon atoms, an aryl group having 1 to 20 carbon atoms or a cycloalkyl group having 3 to 20 carbon atoms; and r represents a number of 0 to 2. Concrete examples are triethylaluminum, tri-n-propylaluminum, tri-i-butylaluminum, tricyclopentylaluminum, tricyclohexylaluminum, dimethylaluminum chloride, diethylaluminum chloride, di-n-butylaluminum chloride, ethylaluminum sesquichloride, ethylaluminum dichloride. Among these, triethylaluminum alone or a mixture of two kinds of organoaluminum compounds such as triethylaluminum with tri-i-butylaluminum, triethylaluminum with diethylaluminum chloride, triethylaluminum with ethylaluminum sesquichloride; or the like, or a mixture of three kinds of organoaluminum compounds such as triethylaluminum with tri-i-butylaluminum and ethylaluminum sesquichloride is preferably used.

As the organic acid ester, the same compounds as the organic acid esters used in the step of preparing the complex compound may be used. Among these, aromatic carboxylic acid esters such as ethyl benzoate, methyl toluylate, ethyl toluylate, methyl anisate, ethyl anisate, etc. are preferable.

As for the manner in which the solid product, an organoaluminum compound and an organic acid ester are combined, there are various manners such as (1) a manner wherein the solid product (II), an organoaluminum compound and an organic acid ester are each independently fed to the polymerization vessel, (2) a manner wherein a mixture of an organoaluminum compound with an organic acid ester and the solid product (II) are each independently fed to the polymerization vessel, (3) a manner wherein a mixture of the solid product (II), an organoaluminum compound and an organic acid ester is fed to the polymerization vessel, and the like manners, and any of these manners may be employed. Among these, however, the manners (1) or (2) may often be preferable. When the above three are combined as described above, the respective components or either one of them may be dissolved or suspended in an aliphatic hydrocarbon such as butane, pentane, hexane, heptane, nonane, decane, kerosene, etc. and used. In the case where the two or three components are mixed in advance of being fed to the polymerization vessel, as in the cases (2) and (3), the temperature is in the range of −50° to +50° C., preferably −30° to +30° C., and the time is in the range of 5 minutes to 50 hours, preferably 10 minutes to 30 hours.

The amount of the organoaluminum compound used is in the range of 10 to 1,000 mols, preferably 50 to 500 mols based on one mol of titanium atom contained in the solid product (II) as the solid catalyst component. The amount of the organic acid ester used is in the range of 0.01 to 1 mol, preferably 0.05 to 0.7 mol based on one mol of the organoaluminum compound. When mixed organoaluminum compounds or mixed organic acid esters are used, it will do if the respective total mols thereof fall within the above ranges.

α-Olefin polymers are produced with α-olefins having 3 or more carbon atoms, using a catalyst obtained by combining the solid product (II) as the solid catalyst component of the present invention with an organoaluminum compound and preferably an organic acid ester. As the α-olefins having 3 or more carbon atoms, propylene, butene-1, pentene-1, hexene-1, octene-1, decene-1, 4-methylpentene-1, 3-methylpentene-1, etc. may be used. Polymerization of these α-olefins includes not only homopolymerization but copolymerization thereof with one or more kinds of other α-olefins having 2 or more carbon atoms. Examples of α-olefins having 2 or more carbon atoms are ethylene, butadiene, isoprene, 1,4-pentadiene, methyl-1,4-hexadiene, etc. in addition to the above α-olefins having 3 or more carbon atoms. The amount of these other olefins used is an amount in which they will be contained in the resulting copolymer obtained by copolymerization in 30% by mol or less. Polymerization may be carried out in liquid phase or in gas phase. In the case where polymerization is carried out in liquid phase, an inert hydrocarbon solvent such as hexane, heptane, nonane, decane, kerosene, etc. may be used as a polymerization medium, but it is also possible to use α-olefins themselves as a reaction medium. In the case where polymerization is carried out in gas phase, no reaction medium is used in principle, but it is also possible to dissolve or suspend either one of the catalyst or its component in the above inert hydrocarbon and use the resulting solution or suspension. Polymerization is carried out by contacting α-olefins with the catalyst in the polymerization vessel. The polymerization temperature is in the range of 40° to 200° C., preferably 50° to 150° C. and the polymerization pressure is in the range of the atmospheric pressure to 100 Kg/cm²G, preferably 5 to 50 Kg/cm²G. Polymerization may be carried out in any of batchwise manner, semicontinuous manner and continuous manner, but continuous manner polymerization is commercially preferable. Further it is also possible to carry out polymerization through a multi-stage polymerization wherein polymerization conditions are varied. In order to adjust the molecular weight of polymer, it is effective to add a molecular weight modifier such as hydrogen to the polymerization system.

Preparation or preservation of the solid catalyst component, preparation of the catalyst and production of polymers as described above must be carried out in an atmosphere of an inert gas such as nitrogen, helium, etc., but in certain cases, it is also possible to carry out them in an atmosphere of monomer or under vacuum condition.

The effectiveness obtained by the present invention is as follows:

Since the solid product (II) as a solid catalyst component, when combined with an organoaluminum compound and preferably an organic acid ester, exhibits an extremely high polymerization activity, the step of removing residual catalyst in polymer can be omitted and since the resulting polymer has an extremely high stereoregularity, it is also possible to omit the step of removing atactic polymer; hence it has an economical effectiveness. The solid product (II) has a spherical or nearly spherical form and it is possible to adjust its average particle diameter to about 5 to about 60 µm. Polymers obtained using the solid product (II) have also a nearly spherical form as a reflection of the form of the solid product (II), and the amount of finely divided powder polymers having particle diameters less than 100 µ is extremely small or nil. In view of these facts, in the liquid phase polymerization process and the gas phase polymerization process such as slurry polymerization, bulk polymerization, etc., a long term stabilized production and transportation of polymers are possible, and it is also possible to make the production steps simpler than conventional ones. This is very advantageous above all for the polymer production according to the gas phase polymerization process. Further since the particulate form of polymers is good, their fluidity is also good, and even in the case of copolymers, deterioration of the particulate form and reduction in the bulk density are so small that copolymers are easily produced.

With regard to the solid product (II) and products corresponding thereto in the following Examples and Comparative examples, their analysese were carried out as follows:

There were used solid products (II) or products corresponding thereto, containing at least 50% by weight of a liquid inert hydrocarbon, or having a portion of the liquid inert hydrocarbon removed by concentration, or further diluted with the liquid inert hydrocarbon; their particulate forms were observed with an optical microscope; and their particle diameters were measured with Micron Photo Sizer (SKC-2000 type, manufactured by Seishin Kigyosha). Further, a product obtained by allowing solid products (II) or products corresponding thereto containing at least 50% by weight of a liquid inert hydrocarbon, to stand in a current of high purity helium (commercially available product) for one hour and then drying it under reduced pressure (about $10^{-3}$ mmHg) at 25° C. for 2 hours, was mixed with purified Nujol, and the mixture was subjected to a composition analysis such as measurement of transmission type infrared absorption spectra according to a Fourier transformation infrared spectrophotometer (JIR 40D type, manufactured by Nippon Densi Co.), measurement of specific surface area and pore volume according to gas adsorption method (Accusorb 2100 type, manufactured by Micromeritics Co.), measurement of X-ray diffraction spectra according to a goniometer with Cu K$\alpha$ray (A=1.54Å) (PMG-S2 type, manufactured by Rigaku Denki Co.; Ni filter, 35 KV, 28 mA), and determination of elements of Mg, Cl, Ti, etc. and alkoxy group according to atomic-absorption spectroscopy and gas chromatography after the solid product (II) or the corresponding product was decomposed with dilute sulfuric acid to make it water-soluble.

Further, as for the absorbances according to the infrared spectrophotometry, a straight line connecting the absorption spectra and the intersection of 1,103 cm$^{-1}$ and 991 cm$^{-1}$ was made the base line for the absorptions having peaks in the vicinity of 1,067 cm$^{-1}$ and in the vicinity of 1,038 cm$^{-1}$, while a straight line connecting the absorption spectra and the intersection of 1,712 cm$^{-1}$ and 1,523 cm$^{-1}$ was made the base line for the absorption having a peak in the vicinity of 1,670 cm$^{-1}$, to calculate absorbance ratios.

The alkoxy group in the solid products (II) or products corresponding thereto was sought by decomposing the solid products (II) or products corresponding thereto with dilute sulfuric acid to make them water-soluble and thereby quantitatively convert them into an alcohol, which was then determined according to gas chromatography. As for the organic acid ester in the solid products (II), the products (II) were treated as in the case of the determination of the alkoxy group to liberate the organic acid esters, which were then determined according to gas chromatography.

The present invention will be described by way of Examples.

EXAMPLE 1

(1) Preparation of solid catalyst component

Purified decane (30 ml), anhydrous magnesium chloride (4.76 g), n-butyl orthotitanate (17 g) and 2-ethyl-1-hexanol (19.5 g) were mixed together in a glass flask, followed by dissolving the mixture by heating it to 130° C. for one hour to obtain a uniform solution, cooling the solution down to room temperature, adding ethyl p-toluylate (3.7 g) and successively diethylaluminum chloride (0.42 g), heating the mixture to 70° C. for one hour, successively dropwise adding SiCl$_4$ (52 g) with stirring over 2.5 hours to deposit solids, further heating the mixture to 70° C. for one hour, separating the solids from the solution, and washing with purified hexane to obtain a solid product (I). The total quantity of this solid product (I) was mixed with TiCl$_4$ (50 ml) dissolved in 1,2-dichloroethane (50 ml), followed by reacting the mixture with stirring at 80° C. for 2 hours to obtain a solid product (II), successively washing this product with purified hexane, and adding purified hexane without drying to obtain a suspension of the solid product (II). The solid product (II) was present in a proportion of 30 g in 1 l of the suspension. The above operations and similar ones in the succeeding Examples and Comparative examples were all carried out in nitrogen atmosphere.

The resulting solid product (II) had a spherical form and a narrow particle diameter distribution, and the particles had an average particle diameter of 22 µm, a specific surface area of 220 m$^2$/g and a pore volume of 0.20 cm$^3$/g. The results of composition analysis were as follows: Ti 3.4% by weight (hereinafter denoted merely as %), Cl 56.9%, Mg 16.4%, Al 0.9%, Si 1.0%, ethyl p-toluylate 5.4%, butoxy group 3.9% and ethylhexanoxy group 1.0%. According to the infrared spectrophotometry, there were present strong absorptions having peaks at 1,666 cm$^{-1}$ (absorbance A$_3$), 1,065 cm$^{-1}$ (absorbance A$_1$) and 1,038 cm$^{-1}$ (absorbance A$_2$), and the absorbance ratios A$_1$/A$_2$ and A$_1$/A$_3$ were 1.3 and 0.55, respectively. According to the X-ray diffraction method, there were obtained X-ray diffraction spectra clearly distinct from those of magnesium chloride, a complex of magnesium chloride with ethyl toluylate, a complex of magnesium chloride with 2-ethylhexanol and a complex of magnesium chloride with n-butyl orthotitanate.

(2) Production of α-olefin polymer

Into a 3 l capacity stainless reactor equipped with a mult-stage stirrer and purged with propylene were fed triethylaluminum (1.5 mmol), ethylaluminum sesquichloride (0.5 mmol), ethyl p-anisate (0.5 mmol), the solid product (II) in an amount of 0.01 mg in terms of Ti atoms and hydrogen (1.5 l), followed by carrying out polymerization for 2 hours while continuously introducing propylene so as to give a total pressure of 22 Kg/cm$^2$G at 70° C. There-after, unreacted propylene was discharged to obtain powdery polypropylene (213 g). This polypropylene had a bulk density (hereinafter referred to as BD) of 0.45 and a MFR of 3.0, and the particles had a nearly spherical form, an average particle diameter of 410 μm and the proportion of finely divided powder having particle-diameters of 100 μm or less was 0.05% by weight based on the total polymer. The percentage of extraction residue with boiling heptane was 97.0%. The polypropylene was difficultly ground.

COMPARATIVE EXAMPLE 1

A product corresponding to the solid product (II) was prepared as in Example 1 except that n-butyl orthotitanate (17 g) was not used, and an α-olefin polymer was produced using this product corresponding to the solid product (II). The product corresponding to the solid product (II) had a granular form and a broad particle diameter distribution, its average particle diameter being 12 μm. According to the composition analysis, Ti was 2.2%; ethyl p-toluylate, 17.3%; and ethylhexanoxy group, 0.8%, and no butoxy group was present. According to the infrared spectrophotometry, a strong absorption having a peak at 1,674 cm$^{-1}$ was present, but absorptions having peaks in the vicinity of 1,067 cm$^{-1}$ and in the vicinity of 1,038 cm$^{-1}$ were absent. The resulting polypropylene had a BD of 0.29; the polymer particles had a granular form; the proportion of finely divided power of 100 μm or less was 3.5% of the total polymer; and the percentage of heptane-extraction residue was 93.8%. The polyemrization results are shown in Tables 1 and 2.

COMPARATIVE EXAMPLE 2

A product corresponding to the solid product (II) was prepared as in Example 1 except that 2-ethyl-1-hexanol (19.4 g) was not used, to produce an α-olefin polymer using the product corresponding to the solid product (II). This product corresponding to the solid product (II) was irregular in form and had a very broad particle diameter distribution, its average particle diameter being 15 μm. The product contained Ti (1.9%), ethyl p-toluylate (16.0%) and butoxy group (0.2%), and no ethylhexanoxy group was present.

According to the infrared spectrophotometry, a strong absorption having a peak at 1,678 cm$^{-1}$ was present, but absorptions having peaks in the vicinity of 1,067 cm$^-$and in the vicinity of 1,038 cm$^{-1}$ were absent. The resulting polypropylene had a BD of 0.27; the polymer particles were irregular in their forms; the proportion of finely divided powder of 100 μm or less was 9.2% of the total polymer; and the percentage of boiling heptane extraction residue was 92.6%.

COMPARATIVE EXAMPLE 3

A product corresponding to the solid product (II) was prepared as in Example 1 except that diethylaluminum chloride (0.42 g) was not used, to produce an α-olefin polymer using the product corresponding to the solid product (II). This product corresponding to the solid product (II) was nearly spherical, but its particle diameter distribution was broad and its average particle diameter was 20 μm. The product contained Ti (3.1%), ethyl p-toluylate (5.5%), butoxy group (2.6%) and ethylhexanoxy group (0.7%).

According to the infrared spectrophotometry, absorptions having peaks at 1,674 cm$^{-1}$ (absorbance A$_3$), 1,064.5 cm$^{-1}$ (absorbance A$_1$) and 1,037.5 cm$^{-1}$ (absorbance A$_2$) were present, but the absorbance ratios A$_1$/A$_2$ and A$_1$/A$_3$ were 1.5 and 0.20, respectively. The resulting polypropylene had a BD of 0.38; the polymer particles were granular; the proportion of finely divided powder of 100 μm or less was 1.8%; and the percentage of boiling heptane extraction residue was 94.4%.

EXAMPLES 2~5

Solid products (II) were prepared as in Example 1 except that n-butyl orthotitanate was replaced by n-butyl polytitanate (pentamer) (12 g) (Example 2); 2-ethyl-1-hexanol was replaced by n-heptanol (17.5 g) (Example 3); diethylaluminum chloride was replaced by triethylaluminum (0.40 g) (Example 4); or diethylaluminum chloride was used in an amount of 0.84 g in place of 0.42 g (Example 5), to produce α-olefin polymers using the above solid products (II).

EXAMPLES 6~8

Solid products (II) were prepared as in Example 1 except that n-butyl orthotitanate was used in an amount of 9 g in place of 17 g and 2-ethyl-1-hexanol was used in an amount of 26 g in place of 19.5 g (Example 6); the former was used in 34 g and the latter, in 3.3 g (Example 7); or the former was used in 26 g and the latter, in 13 g (Example 8), to produce α-olefin polymers using the above solid products (II).

EXAMPLES 9~12

Solid products (II) were prepared as in Example 1 except that in place of adding ethyl p-toluylate, successively diethylaluminum chloride and successively SiCl$_4$ to the uniform solution first obtained in Example 1, a mixture obtained in advance by mixing and contacting ethyl p-toluylate (3.7 g) with diethylaluminum chloride (0.42 g) in purified decane (5 ml) was added to the uniform solution at room temperature (Example 9); ethyl p-toluylate was added to the uniform solution at room temperature, followed by heating to 70° C. for one hour, thereafter adding SiCl$_4$ to deposit solids, further heating to 70° C. for one hour, returning the temperature to room one, adding diethylaluminum chloride and stirring at room temperature for one hour (Example 10); the uniform solution was heated to 70° C., followed by dropwise adding SiCl$_4$ to deposit solids, returning the temperature to room one, adding ethyl p-toluylate and successively diethylaluminum chloride, and further heating to 70° C. for one hour (Example 11); or ethyl p-toluylate, diethylaluminum chloride and SiCl$_4$ were at the same time added to the uniform solution at room temperature, over 30 minutes, followed by raising the temperature to 70° C. over 2 hours (Example 12), to produce α-olefin polymers using the solid products (II).

EXAMPLES 13~14

Solid products (II) were prepared as in Example 1 except that ethyl p-toluylate (3.7 g) was replaced by ethyl benzoate (3.4 g) (Example 13) or by methyl p-toluylate (3.4 g) (Example 14), to produce α-olefin polymers using the solid products (II).

COMPARATIVE EXAMPLES 4~8

Products corresponding to the solid product (II) were prepared as in Example 6, Example 7 or Example 8 except that no 2-ethyl-1-hexanol was used in Example 6 (Comparative example 4); no n-butyl orthotitanate was used in Example 7 (Comparative example 5); and in Example 8, no 2-ethyl-1-hexanol was used (Comparative example 6); no n-butyl orthotitanate was used (Comparative example 7) and no diethylaluminum chloride was used (Comparative example 8), to produce α-olefin polymers using the respective products corresponding to solid product (II).

EXAMPLE 15

(1) Preparation of solid catalyst component

Purified nonane (50 ml), anhydrous magnesium chloride (4.76 g), ethyl orthotitanate (14.8 g) and n-octanol (16.3 g) were mixed together in a stainless flask, followed by heating the mixture to 110° C. for 2 hours with stirring to obtain a uniform solution, cooling the solution to 70° C., adding to this solution, a product obtained in advance by contacting anhydrous AlCl$_3$ (1.5 g) with ethyl benzoate (3.4 g) through co-milling, and dissolving it in the solution, successively dropwise adding ethylsilicon trichloride (57 g) over 2.5 hours to deposit solids, stirring at 70° C. for one hour, separating the solids from the solution, and washing with purified hexane to obtain a solid product (I). This solid product (I) was mixed with TiCl$_4$ (100 ml), followed by reacting the mixture at 110° C. for 1.5 hour with stirring to obtain a solid product (II), successively washing this product with purified hexane and adding purified hexane without drying the product, to obtain a hexane suspension, which contained the solid product (II) in a proportion of 10 g in 100 ml of the suspension.

The solid product (II) had a spherical form and a narrow particle diameter distribution, and the particles had an average particle diameter of 18 μm, a specific surface area of 230 m$^2$/g and a pore volume of 0.30 cm$^3$/g. According to the composition analysis, the product contained Ti (2.6%), Cl (57.2%), Mg (15.9%), Al (1.2%), Si (0.9%), ethyl benzoate (7.2%), ethoxy group (3.0%) and octoxy group (0.7%). According to the infrared spectrophotometry, strong absorptions having peaks at 1,674 cm$^{-1}$ (absorbance A$_3$), 1068 cm$^{-1}$ (absorbance A$_1$) and 1,038 cm$^{-1}$ (absorbance A$_2$) were present and the absorbance ratios A$_1$/A$_2$ and A$_1$/A$_3$ were 1.5 and 0.43, respectively. According to the X-ray diffraction method, there were obtained X-ray diffraction spectra clearly distinctive from those of the complex of magnesium chloride with ethyl orthotitanate, the complex of magnesium chloride with n-octanol and the complex of magnesium chloride with ethyl benzoate.

(2) Production of α-olefin polymer

Into a nitrogen-purged, 3.6 l capacity autoclave were fed triethylaluminum (1.33 mmol), diethylaluminum chloride (0.67 mmol), methyl p-toluylate (0.5 mmol) and the solid product (II) in an amount of 8.0×10$^{-3}$ mg atoms in terms of Ti atoms, followed by introducing liquid propylene (1 Kg) together with hydrogen(700ml), to carry out polymerization at 70° C. for one hour, during which the total pressure was 32 Kg/cm$^2$G. Unreacted propylene was then discharged to obtain powdery polypropylene (370 g). This polypropylene had a BD of 0.44 and a MFR of 3.5; the polymer particles had a nearly spherical form and an average particle diameter of 490 μm; the proportion of finely divided powder having particle diameters of 100 μm or less was 0.02% by weight of the total polymer; and the percentage of boiling heptane extraction residue was 96.7%.

COMPARATIVE EXAMPLES 9~11

Products corresponding to solid product (II) were prepared as in Example 15 except that no ethyl orthotitanate was used (Comparative example 9); no n-octanol was used (Comparative example 10); or no anhydrous aluminum chloride was used (Comparative example 11), to produce α-olefin polymers using the products corresponding to solid product (II).

REFERENCE EXAMPLE

Preparation of Comparative samples for X-ray diffraction

COMPARATIVE SAMPLE A

Anhydrous magnesium chloride (0.1 mol) was milled in a vibration ball mill (manufactured by Specks Kogyo) at room temperature in nitrogen atmosphere for 30 minutes.

COMPARATIVE SAMPLE B

Anhydrous magnesium chloride (0.05 mol, 2-ethyl-1-hexanol (0.15 mol) and decane (20 ml) were reacted in nitrogen atmosphere at 130° C. for 2 hours with stirring, followed by distilling off decane at 90° C. under reduced pressure (~5 mmHg) to obtain colorless solids.

COMPARATIVE SAMPLE C

Anhydrous magnesium chloride (5 mmols) was reacted in ethyl benzoate (100 ml) at 70° C. for one hour, followed by distilling off unreacted ethyl benzoate at about 75° C. under reduced pressure (~5 mmHg) to obtain colorless solids.

COMPARATIVE SAMPLE D

Anhydrous magnesium chloride (0.1 mol) was reacted with ethyl p-toluylate (0.01 mol) by co-milling in a vibration ball mill in nitrogen atmosphere at 30~40° C. for 30 minutes.

TABLE 1

Analytical results of solid catalyst component (or corresponding material)

| | Particulate form | Particle diameter distribution | ~1670$cm^{-1}$ ($A_3$)* | Results of infrared spectrophotometrical analysis | | | | Results of composition analysis | |
|---|---|---|---|---|---|---|---|---|---|
| | | | | ~1067 ($A_1$) | ~1038 ($A_2$) | $A_1/A_2$ | $A_1/A_3$ | % (RO)b | % (RO)c |
| Example 1 | Spherical | Narrow | 1666, VS | 1065, S | 1038, M | 1.2 | 0.55 | 3.9 | 1.0 |
| Compar. ex. 1 | Granular | Broad | 1678, VS | — | — | — | — | — | 0.8 |
| Compar. ex. 2 | Irregular | Very broad | 1674, VS | — | — | — | — | 0.2 | — |
| Compar. ex. 3 | Nearly spherical | Broad | 1674, VS | 1064.5 M | 1037.5 W | 1.5 | 0.20 | 2.6 | 0.7 |
| Example 2 | Spherical | Narrow | 1667, VS | 1065, S | 1038, M | 1.3 | 0.52 | 3.5 | 1.0 |
| Example 3 | " | Narrow | 1668, VS | 1065, S | 1038, M | 1.2 | 0.50 | 3.7 | 0.9 |
| Example 4 | " | Narrow | 1664, VS | 1065, S | 1038, M | 1.4 | 0.38 | 3.0 | 0.8 |
| Example 5 | " | Narrow | 1665, VS | 1065, S | 1038, M | 1.4 | 0.42 | 2.8 | 0.7 |
| Example 6 | " | Narrow | 1668, VS | 1065, S | 1038, M | 1.7 | 0.70 | 1.9 | 1.2 |
| Example 7 | Nearly spherical | Somewhat broad | 1670, VS | 1065, S | 1038, M | 1.1 | 0.32 | 4.1 | 0.2 |
| Example 8 | Nearly spherical | Narrow | 1667, VS | 1065, S | 1038, M | 1.2 | 0.30 | 3.9 | 0.4 |
| Example 9 | Spherical | Narrow | 1668, VS | 1065, S | 1038, M | 1.3 | 0.57 | 3.8 | 1.0 |
| Example 10 | " | Narrow | 1667, VS | 1065, S | 1038, M | 1.2 | 0.38 | 3.7 | 0.8 |
| Example 11 | Nearly spherical | Somewhat broad | 1669, VS | 1065, S | 1038, M | 1.3 | 0.31 | 3.4 | 0.7 |
| Example 12 | Nearly spherical | Somewhat broad | 1670, VS | 1065, S | 1038, M | 1.2 | 0.35 | 3.8 | 0.8 |
| Example 13 | Spherical | Narrow | 1674, VS | 1065, S | 1038, M | 1.2 | 0.61 | 4.0 | 1.1 |
| Example 14 | " | Narrow | 1674, VS | 1065, S | 1038, M | 1.1 | 0.40 | 4.1 | 0.8 |
| Compar. ex. 4 | Irregular | Very broad | 1674, VS | — | — | — | — | 0.1 | — |
| Compar. ex. 5 | " | Broad | 1676, VS | — | — | — | — | — | 0.3 |
| Compar. ex. 6 | " | Very broad | 1674, VS | — | — | — | — | 0.4 | — |
| Compar. ex. 7 | Granular | Broad | 1675, VS | — | — | — | — | — | 0.6 |
| Compar. ex. 8 | " | Broad | 1674, VS | 1065, W | 1038, W | 1.4 | 0.18 | 2.7 | 0.5 |
| Example 15 | Spherical | Narrow | 1674, VS | 1068, S | 1038, M | 1.5 | 0.43 | 3.0 | 0.7 |
| Compar. ex. 9 | Granular | Broad | 1675, VS | — | — | — | — | — | 0.6 |
| Compar. ex. 10 | Irregular | Very broad | 1674, VS | — | — | — | — | 0.5 | — |
| Compar. ex. 11 | Granular | Broad | 1674, VS | 1065, M | 1038, W | 1.5 | 0.17 | 2.1 | 0.5 |

Note:
*VS, Very strong;
S, Strong;
M, Medium;
W, Weak

TABLE 2

| | Polymerization results | | | | |
|---|---|---|---|---|---|
| | Polymer yield Polymer (g)/ Ti atom (mg) | Polymer form | BD g/ml | Amount of fine powder wt. % | Percentage of boiling heptane extraction residue % |
| Example 1 | 21,300 | Nearly spherical | 0.45 | 0.08 | 97.0 |
| Compar. ex. 1 | 17,300 | Granular | 0.29 | 3.5 | 93.8 |
| Compar. ex. 2 | 4,180 | Irregular | 0.27 | 9.2 | 92.6 |
| Compar. ex. 3 | 17,100 | Nearly spherical | 0.38 | 1.8 | 94.4 |
| Example 2 | 19,800 | Nearly spherical | 0.44 | 0.1 | 96.7 |
| Example 3 | 19,000 | Nearly spherical | 0.42 | 0.1 | 96.5 |
| Example 4 | 20,800 | Nearly spherical | 0.44 | 0.09 | 96.9 |
| Example 5 | 20,600 | Nearly spherical | 0.42 | 0.09 | 96.4 |
| Example 6 | 18,700 | Nearly spherical | 0.40 | 0.5 | 96.2 |
| Example 7 | 17,600 | Nearly spherical | 0.37 | 0.7 | 95.7 |
| Example 8 | 20,700 | Nearly spherical | 0.43 | 0.09 | 96.5 |
| Example 9 | 21,200 | Nearly spherical | 0.44 | 0.08 | 96.8 |
| Example 10 | 19,700 | Nearly spherical | 0.43 | 0.1 | 96.5 |
| Example 11 | 19,500 | Nearly spherical | 0.42 | 0.1 | 96.3 |
| Example 12 | 20,300 | Nearly spherical | 0.44 | 0.09 | 96.8 |
| Example 13 | 19,000 | Nearly spherical | 0.46 | 0.08 | 97.1 |
| Example 14 | 20,400 | Nearly spherical | 0.45 | 0.09 | 97.0 |
| Compar. ex. 4 | 4,840 | Irregular | 0.28 | 8.7 | 93.3 |
| Compar. ex. 5 | 13,000 | " | 0.29 | 4.6 | 93.8 |
| Compar. ex. 6 | 6,100 | " | 0.30 | 8.3 | 93.5 |
| Compar. ex. 7 | 16,300 | " | 0.31 | 3.7 | 93.9 |
| Compar. ex. 8 | 16,000 | Granular | 0.36 | 2.4 | 94.3 |
| Example 15 | 46,300 | Nearly spherical | 0.44 | 0.02 | 96.7 |
| Compar. ex. 9 | 27,800 | Granular | 0.31 | 2.4 | 93.6 |
| Compar. ex. 10 | 5,100 | Irregular | 0.28 | 10.5 | 92.3 |

TABLE 2-continued

| | Polymerization results | | | | |
|---|---|---|---|---|---|
| | Polymer yield Polymer (g)/ Ti atom (mg) | Polymer form | BD g/ml | Amount of fine powder wt. % | Percentage of boiling heptane extraction residue % |
| Compar. ex. 11 | 32,400 | Granular | 0.35 | 1.2 | 94.1 |

What we claim is:

1. A solid catalyst component for olefin polymerization, consisting of a solid composition containing as indispensable components, magnesium, titanium, aluminum, halogen and alkoxy group, characterized in that
   (1) when said catalyst component is subjected to infrared spectrophotometry, it has two absorption peaks in the vicinity of 1,067 cm$^{-1}$ and in the vicinity of 1,038 cm$^{-1}$ within the region of 1,070~1,030 cm$^{-1}$, and when the absorbance at the former peak is referred to as $A_1$ and that at the latter peak, as $A_2$, the ratio of $A_1$ to $A_2$ is in the range of 1.1 to 1.8, and also when the absorbance in the vicinity of 1,670 cm$^{-1}$ is referred to as $A_3$, the ratio of $A_1$ to $A_3$ is in the range of 0.30 to 0.80;
   (2) in a state where no liquid inert hydrocarbon is contained, said solid catalyst component contains two kinds of alkoxy groups based on a combination of titanic acid ester(s) and an alcohol, both as starting raw materials for said catalyst component, the respective amounts of the alkoxy groups being each in the range of 0.05 to 5.0% by weight, and the sum of the amounts thereof being in the range of 0.1 to 7.0% by weight; and
   (3) said solid catalyst component has X-ray diffraction spectra which are clearly distinctive from those of magnesium halide or a complex of magnesium halide with an electron donor.

2. A process for producing a solid catalyst component for olefin polymerization, characterized by producing it via the reaction of the following steps I to III:
   I. a step of mixing (a) an anhydrous magnesium dihalide, (b) an orthotitanic acid ester expressed by the general formula Ti(OR$^1$)$_4$ and/or a polytitanic acid ester expressed by the general formula R$^2$—O-Ti(OR$^3$)(OR$^4$)]$_m$O-R$^5$ wherein R$^1$, R$^2$, R$^3$, R$^4$, and R$^5$ each represent an alkyl group having 1 to 20 carbon atoms, an aryl group having 1 to 20 carbon atoms or a cycloalkyl group having 3 to 20 carbon atoms and m represents a number of 2 to 20, and (c) a saturated or unsaturated, monohydric or polyhydric alcohol, in an inert hydrocarbon solvent and dissolving these materials therein, to obtain a component A;
   II. a step of mixing and reacting said component A with a component B consisting of (d) an aliphatic or aromatic mono- or polycarboxylic acid ester having 2 to 24 carbon atoms (hereinafter referred to as organic acid ester), (e) an aluminum halide expressed by the general formula AlX$_n$R$^8{}_{3-n}$ wherein X is Cl or Br, R$^8$ represents an alkyl group having 1 to 20 carbon atoms, an aryl group having 1 to 20 carbon atoms or a cycloalkyl group having 3 to 20 carbon atoms and n represens a number of 0 to 3, and (f) a silicon halide expressed by the general formula SiX$_l$R$^6{}_{4-l}$ or SiX$_p$(OR$^7$)$_{4-p}$ wherein X represents Cl or Br, R$^6$ and R$^7$ each represent an alkyl group having 1 to 20 carbon atoms, an aryl group having 1 to 20 carbon atoms or a cycloalkyl group having 3 to 20 carbon atoms, and l and p each represent a number of 1 to 4, to deposit solids (hereinafter referred to as "solid product (I)"); and
   III. reacting this solid product (I) with a component C consisting of (g) a titanium halide expressed by the general formula TiX$_q$(OR$^9$)$_{4-q}$ wherein X represents Cl or Br, R$^9$ represents an alkyl group having 1 to 20 carbon atoms, an aryl group having 1 to 20 carbon atoms or a cycloalkyl group having 3 to 20 carbon atoms and q represents a number of 1 to 4, and/or (h) a vanadyl halide or a vanadium halide expressed by the general formulas VOX$_s$(OR$^{10}$)$_{3-s}$ or VX$_t$(OR$^{11}$)$_{4-t}$ wherein X represents Cl or Br, R$^{10}$ and R$^{11}$ each represent an alkyl group having 1 to 20 carbon atoms, an aryl group having 1 to 20 carbon atoms or a cycloalkyl group having 3 to 20 carbon atoms, s represents a number of 1 to 3, and t represents a number of 1 to 4, to obtain solids (hereinafter referred to as "solid product (II)").

3. A process according to claim 2 wherein said (a), (b) and (c) as raw materials constituting said component A are mixed in an inert hydrocarbon solvent with stirring or shaking at a temperature of 50° to 150° C., under a pressure of 0 to 5 Kg/cm$^2$G, for a time of 10 minutes to 5 hours and dissolved therein.

4. A process according to claim 2 wherein 0.1 to 0.7 mol of an organic acid ester as said component (d), 0.01 to 0.4 mol of an aluminum halide as said component (e) and 1 to 20 mols of a silicon halide as said component (f), each based on one mol of an anhydrous magnesium dihalide as said component (a) constituting said component A as one of the raw materials therefor, are mixed with said component A and reacted together at a temperature of 0 to 130° C., under a pressure of 0 to 5 Kg/cm$^2$G for a time of 10 minutes to 5 hours.

5. A process according to claim 2 wherein said solid product (I) obtained by the reaction of said component A with said component B is washed with an inert hydrocarbon solvent; a titanium halide expressed by the formula TiX$_q$(OR$^9$)$_{4-q}$ as said component (g) and/or a vanadyl or vanadium halide expressed by the formulas VOX$_s$(OR$^{10}$)$_{3-s}$ or VX$_t$(OR$^{11}$)$_{4-t}$ as said component (h) are mixed with said solid product (I) washed as above so that the proportion of said component (g) and/or said component (h) can be in the range of 3 to 50 mols based on one mol of said component (a); the resulting mixture is reacted at a temperature of 50° to 150° C., under a pressure of 0 to 5 Kg/cm$^2$G for a time of 10 minutes to 3 hours; and the resulting solid product (II) is washed with an inert hydrocarbon solvent.

* * * * *